(12) United States Patent
Boydstun et al.

(10) Patent No.: US 7,194,767 B1
(45) Date of Patent: Mar. 20, 2007

(54) SCREENED SUBNET HAVING A SECURED UTILITY VLAN

(75) Inventors: Kenneth C. Boydstun, Carrollton, TX (US); Stephen L. Marshall, Ennis, TX (US); Jun Chen, Lewisville, TX (US)

(73) Assignee: Sprint Communications Company L.P., Overland Park, KS (US)

( * ) Notice: Subject to any disclaimer, the term of this patent is extended or adjusted under 35 U.S.C. 154(b) by 766 days.

(21) Appl. No.: 10/185,920

(22) Filed: Jun. 28, 2002

(51) Int. Cl.
*H04L 9/00* (2006.01)
*G06F 15/16* (2006.01)

(52) U.S. Cl. ............................. 726/14; 726/1; 709/225
(58) Field of Classification Search .................... None
See application file for complete search history.

(56) References Cited

U.S. PATENT DOCUMENTS

| | | | | |
|---|---|---|---|---|
| 5,968,176 A * | 10/1999 | Nessett et al. | ................ | 726/11 |
| 6,085,238 A * | 7/2000 | Yuasa et al. | ................ | 709/223 |
| 6,104,716 A * | 8/2000 | Crichton et al. | ............ | 370/401 |
| 6,182,226 B1 * | 1/2001 | Reid et al. | .................... | 726/15 |
| 6,226,748 B1 * | 5/2001 | Bots et al. | .................... | 726/15 |
| 6,240,533 B1 * | 5/2001 | Slemmer | .................... | 714/48 |
| 6,321,337 B1 * | 11/2001 | Reshef et al. | ................. | 726/14 |
| 6,493,349 B1 * | 12/2002 | Casey | ....................... | 370/409 |
| 6,877,041 B2 * | 4/2005 | Sullivan et al. | ............ | 709/238 |
| 7,103,647 B2 * | 9/2006 | Aziz | ........................ | 709/220 |
| 2002/0116642 A1 | 8/2002 | Joshi et al. | | |
| 2006/0095969 A1 * | 5/2006 | Portolani et al. | ............ | 726/23 |

* cited by examiner

*Primary Examiner*—Christopher Revak

(57) ABSTRACT

A screened subnet for interconnecting an intranet to the Internet includes first and second subnets. A first firewall provides a first level of protection to a portion of the first subnet and to the second subnet while a second firewall provides a second level of protection to the second subnet. A secured utility VLAN provides utility services for the portion of the first subnet and/or the second subnet. The secured utility VLAN is coupled to the screened subnet such that it enjoys an additional level of protection relative to the subnets and/or the portion thereof which it serves. In various embodiments thereof, the screened subnet is configured to include a single, shared, secured utility VLAN for servicing both the portion of the first subnet and the second subnet, or a pair of discrete secured utility VLANs for respectively servicing the portion of the first subnet and the second subnet.

38 Claims, 5 Drawing Sheets

SCREENED SUBNET HAVING A SECURED UTILITY VLAN

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The invention is directed to a screened subnet for interconnecting networks and, more particularly, to a screened subnet which includes a secured virtual local area network ("VLAN") which provides utility services for the screened subnet. By placing those servers providing utility services for the screened subnet into a secured VLAN, the screened subnet may enjoy enhanced security and/or other benefits.

BACKGROUND OF THE INVENTION

The Internet is a vast computer network comprised of a wide variety of disparate computing devices, interconnected by various connection media, which communicate using the transmission control protocol/Internet protocol ("TCP/IP") set of communication protocols. In recent years, it has been increasingly commonplace to interconnect intranets (private networks which also utilize the TCP/IP set of communication protocols) with the Internet. While numerous benefits may be derived from interconnecting an intranet with the Internet, such interconnections pose serious security issues for the intranet. More specifically, an intranet, for example, an internal corporate network, is typically made accessible to only a defined group of users. However, no such limitations apply to the Internet. As a result, when the two are interconnected, there is considerable concern that an unknown and/or untrusted user accessing the intranet via the Internet could vandalize or otherwise manipulate the intranet.

Common practice has been to use a screened subnet to interconnect a trusted network such as an intranet to an untrusted network such as the Internet. Typically, a screened subnet includes one or more servers for providing services to Internet users and at least one firewall which protects the screened subnet and/or the intranet from attacks. While the firewall does provide a certain level of protection to the various servers of the screened subnet, the servers are still considered to be vulnerable to attack. While the web server is at the greatest risk for attack, other servers, for example, a utility server, of the screened subnet are also at risk, particularly if the utility or other server is at the same level as the web server.

It is contemplated that security for a screened subnet which separates an intranet from the Internet may be enhanced by segregating those servers which provide utility and maintenance services for the screened subnet within a secure VLAN. To provide a screened subnet which includes such a VLAN is, therefore, an object of this invention.

SUMMARY OF THE INVENTION

The present invention is directed to a screened subnet for interconnecting a first network to a second network. The screened subnet includes first and second subnets, each of which includes at least one computer device. A first protective device, for example, a first firewall, provides a first level of protection, from the first network, to a portion of the first subnet and to the second subnet while a second protective device, for example, a second firewall, provides a second level of protection, from the first network, to the second subnet. A secured utility VLAN comprised of at least one computer system provides utility services for the portion of the first subnet and/or the second subnet. The secured utility VLAN is coupled to the subnet such that it enjoys an additional level of protection, from the first network, relative to the subnets and/or the portion thereof which it serves. In various embodiments thereof, the screened subnet is configured to include a single, shared, secured utility VLAN for servicing both the portion of the first subnet and the second subnet, or a pair of discrete secured utility VLANs for servicing the portion of the first subnet and the second subnet, respectively.

In certain embodiments thereof, the additional level of protection afforded the single, shared, secured utility VLAN which services the portion of the first subnet is provided by the firewall which provides the second level of protection to the second subnet. In other embodiments thereof, the additional level of protection afforded the single, shared, utility VLAN for servicing both the portion of the first subnet and the second subnet is provided by one or more additional protective devices. Variously, the one or more additional protective devices may be one or more choke routers, one or more firewalls, or a selected combination of choke routers and firewalls. In still other embodiments thereof, the additional level of protection afforded the pair of discrete secured utility VLANS which service the portion of the first subnet and the second subnet, respectively, is provided by one or more additional protective devices. Variously, the one or more additional protective devices may be one or more choke routers, one or more firewalls, or a selected combination of choke routers and firewalls.

In still other embodiments of the invention, a first VLAN encompasses the portion of the first subnet and a second VLAN encompasses another portion second subnet. In this embodiment, the first protective device does not provide the first level of protection to the other portion of the first subnet. Finally, in still yet other embodiments of the invention, links for coupling the third and/or fourth protective devices, respectively, to the second network are also provided.

DETAILED DESCRIPTION OF THE INVENTION

Figure 1:
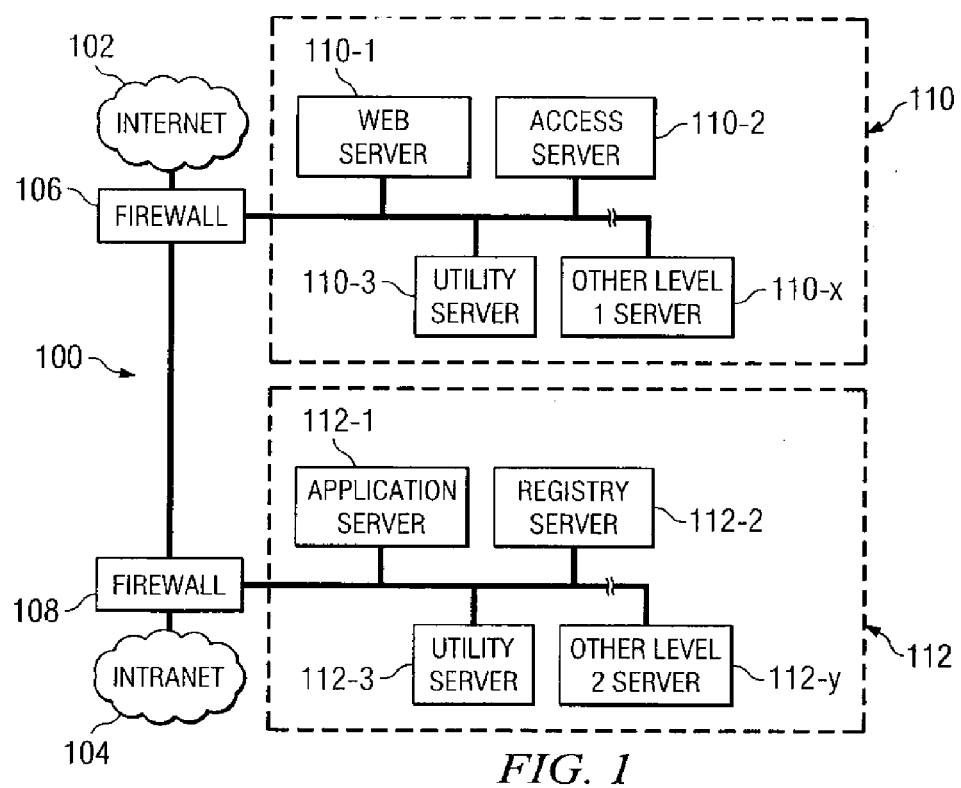
FIG. 1 is a block diagram of a conventionally configured screened subnet.

FIG. 1 shows a conventionally configured screened subnet 100 (also known as a "demilitarized zone" or "DMZ") which interconnects a first network 102, for example, the Internet or another network utilizing the TCP/IP set of communication protocols and a second network 104, for example, an intranet or another network utilizing the TCP/IP set of communication protocols. Remote users accessing the intranet 104 through the Internet 102 are connected through the screened subnet 100. Accordingly, and as will be more fully described below, the screened subnet 100 provides selected services to the remote uses. As disclosed herein, the Internet 102 is presumed to be an untrusted network, the intranet 104 is presumed to be a trusted network, for example, an enterprise network, and the screened subnet 100 serves to protect the intranet 104 from hostile attacks originating from the Internet 102. Of course, it should be clearly understood that screened subnets such as the screened subnet 100 are often used to interconnect a first untrusted network to a second untrusted network. Accordingly, it is fully contemplated that the screened subnet 100 may be used to interconnect various trusted and/or untrusted networks to one another.

The screened subnet 100 includes first and second protective devices 106 and 108, preferably, first and second firewalls, coupled to one another. Typically, the first and second firewalls 106 and 108 are implemented through a combination of routers for allowing or denying packets based on the source/destination address of the port number and hosts for controlling traffic at the application level. The screened subnet 100 further includes first and second subnets 110 and 112, each comprised of one or more servers or other computer systems 110-1 through 110-x, 112-1 through 112-y, respectively, and protected from the Internet 102 by the first and second firewalls 106 and 108, respectively. As illustrated in FIG. 1, the first, or level 1, subnet 110, commonly referred to as the presentation level, includes a web server 110-1, an access server 110-2, a utility server 110-3 and any number of additional level 1 servers 110-x. Of these, the web server 110-1 maintains content which may be viewed by users accessing the web server 110-1 via the Internet 102. Typically, the other level 1 servers of the first subnet 110 will also include one or more mirrored servers (not shown) of the web server 110-1.

As disclosed herein, the web server 110-1 maintains two types of content—unrestricted and restricted. Unrestricted content may be viewed by all users accessing the web server 110-1 while restricted content is limited to viewing by authenticated users who have been authorized to view the restricted content. If a user seeks to view restricted content maintained by the web server 110-1, that user shall be re-directed to the access server 110-2 for execution of an authentication and/or authorization session. Again, depending on the number of users seeking to view restricted content, the other level 1 servers of the first subnet 110 may include any number of additional access servers (also not shown). Of course, the web server 110-1 may, in the alternative, exclusively maintain unrestricted content or exclusively maintain restricted content. Finally, it is contemplated that the utility server 110-3 may be configured to provide a wide variety of services, for example, maintenance, reporting, backup, logging or other services, in support of the access server 110-2 and/or any of the other level 1 servers residing on the subnet 110. Of course, while FIG. 1 shows only a single utility server, specifically, the utility server 110-3, it is fully contemplated that the utility services may be distributed among the utility server 110-3 and any number of additional servers included among the other level 1 servers of the subnet 110.

The second, or level 2, subnet 112 includes an application server 112-1, a registry server 112-2 and any number of other level 2 servers 112-3 through 112-y. Typically, the application server 112-1 functions in support of the web server 110-1. For example, if the content maintained by the web server 110-1 enables the user accessing the content to execute an application, the web server 110-1 would transport the user's commands to the application server 112-1 for execution. The application server 112-1 would return the results to the web server 110-1 for viewing. The registry server 112-2 functions in support of the access server 110-2. More specifically, information collected by the access server 110-2 upon initiation of a process to authenticate and/or authorize a user is transported to the registry server 112-2 for analysis. For example, the registry server 112-2 may compare a password or other identifying information received from the access server 110-2 to entries maintained in a database (not shown) located within the intranet 104 to determine whether the user providing the password or other identified information should be granted the requested access.

Broadly speaking, the first firewall 106 provides a first level of protection to the access, utility and other servers 110-2 through 110-x residing on the first subnet 110 and the servers residing on the second subnet 112 by protecting the access, utility and other server 110-2 through 110-x residing on the first subnet 110, the servers residing on the second subnet 112, as well as any other computer systems or other devices forming part of the intranet 104, from unauthorized accesses by unauthorized users. Generally, the level of protection provided by the first firewall 1006 to each of the servers 110-2 through 110-x and 112-1 through 112-y is generally equal. Similarly, the second firewall 108 provides a second level of protection to the second subnet 112 by protecting the servers residing on the second subnet 112, as well as any other computer systems or other devices forming part of the intranet 104, from unauthorized accesses by unauthorized users. As the second subnet 112 enjoys an additional level of protection relative to the first subnet 110, the second subnet 112 is often referred to as being the "stronger" of the two while the first subnet 110 is often referred to as the "weaker" of the two.

As previously set forth, the first and second firewalls 106 and 108 operate by controlling traffic, oftentimes by rejecting traffic or routing it to selected destinations. Based upon how the first and second firewalls 106 and 108 control traffic, the various servers forming the first and second subnets 110 and 112 may be further classified. More specifically, the first firewall 106 directs a user accessing the screened subnet 100 from the Internet 102 to the web server 110-1. The first firewall 106 will not, however, allow that user to access any of the other servers 110-2 through 110-x forming part of the first subnet 110, any of the servers forming part of the second subnet 112 nor any of the servers forming part of the intranet 104. Accordingly, the first firewall 106 has, in effect, segregated the web server 110-1 (and any mirrored web servers not shown in FIG. 1) from the remaining servers of the first subnet 110. In contrast, the second firewall 108 does not segregate the various servers 112-1 through 112-y forming the second subnet 112 by directing incoming traffic to a specific server or servers thereof. The second firewall 108 does, however, segregate the second subnet 112 from the intranet 104. Thus, any server accessible to one of the servers forming part of either the first subnet 110 or the second subnet 112 through the second firewall 108 should be view as forming part of the second subnet 112 while those servers which cannot be accessed by one of the servers forming part of either the first subnet 110 or the second subnet 112 should be viewed as forming part of the intranet 104.

Traditionally, a screened subnet such as the screened subnet 100 was configured such that utility functionality for the screened subnet 100 was placed on the same level as the servers supported by that functionality. For example, the utility server 110-3 may provide utility functionality for one or more of the access server 110-2 and/or any other level 1 server 110-x residing on the first subnet 110 of the screened subnet 100. Thus, the utility functionality for the access or other servers 110-2 and 110-x was co-located on the same level with the web, access and other servers 110-1, 110-2 and 110-x and. Accordingly, the web, access, utility and other servers 110-1 through 110-x were all provided with the same degree of protection from unauthorized accesses. While the first firewall 106 provides a degree of protection to the utility server 110-3 from unauthorized access or manipulation, generally, servers co-located on the same level as the web server 110-1 are still considered to be vulnerable to attack. As a result, the utility servers located within the first subnet 112 are deemed to be at risk. For example, one functionality commonly installed in a server co-located on the same level as the web server 110-1 is audit functionality for the web server 110-1. An audit record for the web server 110-1 would track the activities of the web server 110-1 and, by examining the audit record, the source of an unauthorized access of the web server 110-1 can be determined. However, if an unauthorized access of the server, for example, the utility server 110-3, in which the audit functionality resides is achieved, the audit record can be manipulated to hide the unauthorized access. Thus, in spite of the use of protective devices such as the first and second firewalls 106 and 108, existing configurations for screened subnets such as the screened subnet 100 are relatively vulnerable to attacks.

Figure 2:
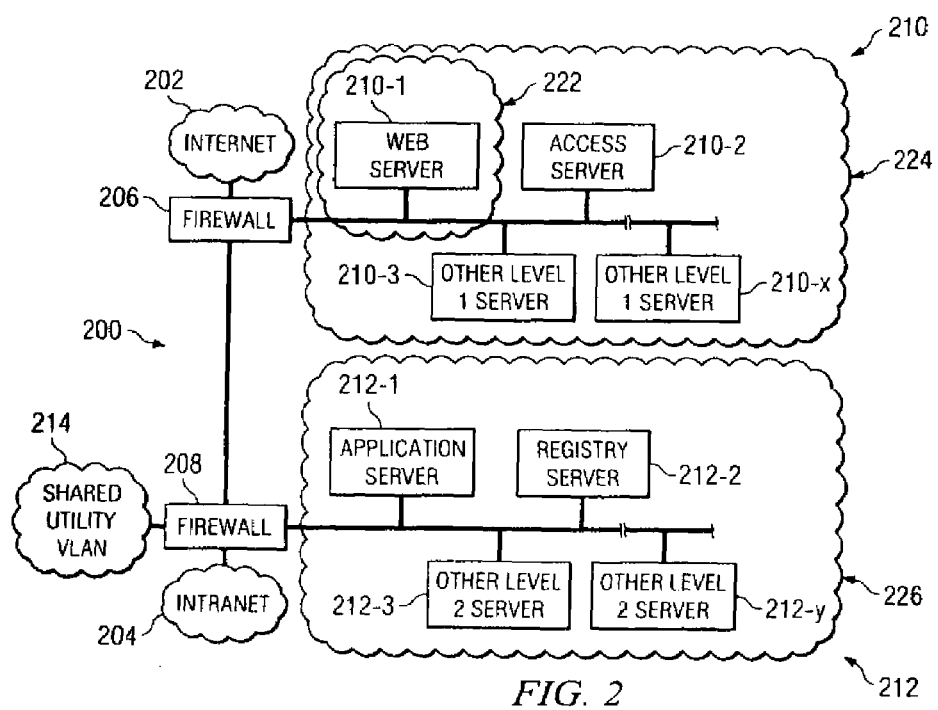
FIG. 2 is a block diagram of a first, single secured utility VLAN, embodiment of a screened subnet constructed in accordance with the teachings of the present invention.

Referring next to FIG. 2, a screened subnet constructed in accordance with a first embodiment of the present invention will now be described in greater detail. As may now be seen, a screened subnet 200 interconnects a first network 202, for example, the Internet or another network utilizing the TCP/IP set of communication protocols and a second network 204, for example, an intranet or another network utilizing the TCP/IP set of communication protocols. Remote users accessing the intranet 204 through the Internet 202 are connected through the screened subnet 200. As disclosed herein, the Internet 202 is presumed to be an untrusted network, the intranet 204 is presumed to be a trusted network, for example, an enterprise network, and the screened subnet 200 serves to protect the intranet 204 from hostile attacks originating from the Internet 202. Of course, it should be clearly understood that screened subnets such as the screened subnet 200 are often used to interconnect a first untrusted network to a second untrusted network. Accordingly, it is fully contemplated that the screened subnet 200 may be used to interconnect any number of trusted and/or untrusted networks to one another.

The screened subnet 200 includes first and second protective devices 206 and 208, preferably, first and second firewalls, coupled to one another. Typically, the first and second firewalls 206 and 208 are implemented through a combination of routers for allowing or denying packets based on the source/destination address of the port number and/or hosts for controlling traffic at the application level.

The screened subnet 200 further includes first and second subnets 210 and 212, each comprised of one or more servers or other computer systems 210-1 through 210-x, 212-1 through 212-y, respectively, and protected from the Internet 202 by the first and second firewalls 206 and 208, respectively. As illustrated in FIG. 1, the first, or level 1, subnet 210, commonly referred to as the presentation level, includes a web server 210-1, an access server 210-2 and any number of additional level 1 servers 210-3 through 210-x. Of these, the web server 210-1 maintains content which may be viewed by users accessing the web server 210-1 via the Internet 202. Typically, the other level 1 servers 210-3 through 210-x of the first subnet 210 will also include one or more mirrored servers (not shown) of the web server 210-1.

As disclosed herein, the web server 210-1 maintains two types of content—unrestricted and restricted. Unrestricted content may be viewed by all users accessing the web server 210-1 while restricted content is limited to viewing by authenticated users who have been authorized to view the restricted content. If a user seeks to view restricted content maintained by the web server 210-1, that user shall be re-directed to the access server 210-2 for execution of an authentication and/or authorization session. Depending on the number of users seeking to view restricted content, the other level 1 servers 210-3 through 210-x of the first subnet 210 may include any number of additional access servers (not shown). Of course, the web server 210-1 may, in the alternative, exclusively maintain unrestricted content or exclusively maintain restricted content.

The second, or level 2, subnet 212, commonly referred to as the business level, includes an application server 212-1, a registry server 212-2 and any number of other level 2 servers 212-3 through 212-y. Typically, the application server 212-1 functions in support of the web server 210-1. For example, if the content maintained by the web server 210-1 enables the user accessing the content to execute an application, the web server 210-1 would transport the user's commands to the application server 212-1 for execution. The application server 212-1 would then return the results to the web server 210-1 for viewing. Although, in the embodiment of the invention illustrated in FIG. 2, a single application server 212-1 capable of being accessed by the web server 210-1 is shown, it is fully contemplated that any number of application servers accessible by the web server 210-1 may form part of the second subnet 212. The registry server 212-2 functions in support of the access server 210-2. More specifically, information collected by the access server 210-2 upon initiation of a process to authenticate and/or authorize a user is transported to the registry server 212-2 for analysis. For example, the registry server 212-2 may compare a password or other identifying information received from the access server 210-2 to entries maintained in a database (not shown) located within the intranet 204 to determine whether the user providing the password or other identified information should be granted the requested access. Again, depending on the number of users seeking to view restricted content, the other level 2 servers 212-3 through 212-y may include any number of additional registry servers (not shown).

Broadly speaking, the first firewall 206 provides a first level of protection to a portion of the first subnet 210 and to the second subnet 212 by protecting the servers residing on that portion of the first subnet 210, the servers residing on the second subnet 212, as well as any other computer systems or other devices forming part of the intranet 204, from unauthorized accesses by unauthorized users. Similarly, the second firewall 208 provides a second level of protection to the second subnet 212 by protecting the servers residing on the second subnet 212, as well as any other computer systems or other devices forming part of the intranet 204, from unauthorized accesses by unauthorized users. As the second subnet 212 enjoys an additional level of protection relative to the first subnet 210, the second subnet 212 is often referred to as being the "stronger" of the two while the first subnet 210 is often referred to as the "weaker" of the two.

As previously set forth, the first and second firewalls 206 and 208 operate by controlling traffic, typically, by rejecting traffic or routing it to selected destinations. Based upon how the first and second firewalls 206 and 208 control traffic, the various servers forming the first and second subnets 210 and 212 may be further classified. More specifically, the first firewall 206 directs a user accessing the screened subnet 200 from the Internet 202 to the web server 210-1. The first firewall 206 will not, however, allow that user to access any of the other servers 210-2 through 210-*x* forming part of the first subnet 210, any of the servers forming part of the second subnet 212 nor any of the servers forming part of the intranet 204. Accordingly, as the first firewall 206 has, in effect, segregated the web server 210-1 from the remainder of the first subnet 210, the first subnet 210 may be viewed as being comprised of a first (or "front") weak VLAN 222 comprised of the web server 210-1 (and any mirrored web servers not shown in FIG. 2) and a second (or "back") weak VLAN 224 comprised of the remaining servers 210-2 through 210-*x* forming part of the first subnet 210.

The second firewall 208 does not segregate the various servers 212-1 through 212-*y* forming the second subnet 212 by directing incoming traffic to a specific server or servers thereof. Rather, the second firewall 208 will allow traffic originating from servers located within the front weak VLAN 222 or the back weak VLAN 224 to travel to servers located within the strong VLAN 226 to which the traffic had been addressed. Thus, the second firewall 208 will allow traffic from the web server 210-1 to travel to the application server 212-1 and allow traffic from the access server 210-2 to travel to the registry server 212-2. The second firewall 208 will, however, block traffic originating on the Internet 202 from both the second subnet 212 and the intranet 204 and block traffic originating on either the front weak VLAN 222 or the back weak VLAN 224 from the intranet 204 Accordingly, the various servers 212-1 through 212-*y* forming the second subnet 212 may be viewed as comprising a strong VLAN 226. The second firewall 208 does, however, segregate the strong VLAN 226 from the intranet 204. Thus, any server accessible to one of the servers forming part of either the front weak VLAN 222 or the back weak VLAN 224 through the second firewall 208 should be view as forming part of the strong VLAN 226 while those servers which cannot be accessed by one of the servers forming part of either the front weak VLAN 222 or the back weak VLAN 224 should be viewed as forming part of the intranet 204.

Continuing to refer to FIG. 2, the screened subnet 200 further includes a secured utility VLAN 214 coupled to the second firewall 208. The secured utility VLAN 214 may be further characterized as a shared secured utility VLAN since the utility servers which provide all of the utility services to the various servers forming part of both the weak back VLAN 224 and the strong VLAN 226 reside therein. Thus, all utility services for the weak back VLAN 224 and the strong VLAN 226 are segregated from the remainder of the subnet 200. The shared secured utility VLAN 214 may be comprised of one or more servers configured to provide various services such as maintenance, reporting, backup, logging or other services, in support of one or more of the access server 210-2, the other level 1 servers 210-3 through 210-*x*, the application server 212-1, the registry server 212-2 and/or the other level 2 servers 212-3 through 212-*y*. The configuration of the server or servers which comprise the shared utility VLAN 214 is not disclosed in further detail, however, since it may vary depending on the particular utility services to be provided thereby and/or the particular level 1 and level 2 servers for which utility services are to be provided.

In the past, the server or servers providing utility services for servers located in the screened subnet, for example, the utility servers 110-3 and 112-3 which provided utility services for the servers 110-2 through 110-*x* and 112-1 through 112-*y* of the first and second subnets 110 and 112, respectively, of the screened subnet 100, were at risk of being vandalized, manipulated or otherwise compromised by unauthorized users. Particularly at risk were those utility servers, for example, the utility server 110-3, which provided utility services to those servers, for example, the access server 110-2 on the same level as the web server, for example, the web server 110-1, as the protection and access controls afforded the utility server is often generally identical to the protection and access controls afforded the web server. Thus, if an unauthorized user successfully compromises the web server, there is an increased likelihood that the unauthorized user will also successfully compromise the servers providing utility or maintenance service to other servers on the same level.

The present invention provides an additional level of protection for those servers providing utility or maintenance service to the weak back VLAN 224 and the strong VLAN 226. More specifically, after segregating, within the shared secured utility VLAN 214, those servers providing such services to the weak back VLAN 224 and the strong VLAN 226, the shared secured utility VLAN 214 is provided with an additional level of protection over the servers 110-2 through 110-*x* of the weak back VLAN 224 for which it provides utility or maintenance services therefore. In the embodiment illustrated in FIG. 2, the shared secured utility VLAN 214 is coupled to the second firewall 208 using an additional network interface card (not shown) which provides an additional set of ports across which the shared secured utility VLAN 214 may be placed. Thus, the second firewall 208 provides a second level of protection to those servers of the shared secured utility VLAN 214 that provides utility or maintenance services to the weak back VLAN 224.

When constructed in the manner illustrated in FIG. 2, utility traffic from the various servers of the weak back VLAN 224 would flow through the second firewall 208 and to the shared secured utility VLAN 214 hanging off of the second firewall 108. Similarly, utility traffic from the various servers of the strong VLAN 226 would also flow through the second firewall 208 and to the shared secured utility VLAN 214. Conversely, traffic from the shared secured utility VLAN 214 would have access to both the weak and strong VLANS 224 and 226 via a flow, in the reverse direction, through the firewall 208. Finally, the shared secured utility VLAN 214 would be accessible to the intranet 204 for administration and data purposes. In this regard, it should be noted that a system administrator for the screened subnet 200 may more readily access the servers providing utility services without weakening the protection of the weak back VLAN 224 and the strong VLAN 226. More specifically, in order to access the shared secured utility VLAN 214, a path from the intranet 204, through the second firewall 208, must be provided. This contrasts favorably with prior configurations, for example, the screened subnet 100 of FIG. 1, for which, in order for the system administrator to access the utility server 110-3, an additional path through the first firewall 106 would have to be provided, thereby increasing the vulnerability of the entire first subnet 110.

While, for the various reasons set forth above, the use of the shared utility VLAN 214 enhances the security of the server or servers providing utility services for the first and second subnets 210 and 212, it is further contemplated that a variety of other benefits are achievable through use of the shared secured utility VLAN 214. More specifically, by segregating the various utility and maintenance servers which collectively comprise the shared secured utility VLAN 214, performance of the utility functions for the weak back VLAN 224 and the strong VLAN 226 may improve as a result of the centralization of these functions within the shared secured utility VLAN 214. For example, if all maintenance, reporting, backup, logging and other utility services to be provided to the weak back VLAN 224 and the strong VLAN 226 reside within the shared secured utility VLAN 214, the utility services will be segregated from normal business traffic for the first and second subnets 210 and 212. As a result, the available power of the servers residing in the shared secured utility VLAN 214 which provide such utility services should increase dramatically. It is further contemplated that, by funneling all utility traffic for the screened subnet 200 to the shared secured utility VLAN 214, the ability of the system administrator for the screened subnet 200, as well as the intranet 204 which it protects, to perform traffic analysis, capacity planning and other administrative tasks will be enhanced by providing a single point from which all utility traffic for the weak back VLAN 224 and the strong VLAN 226 may be measured.

The embodiment of the present invention of a screened subnet 200 having a shared secured utility VLAN 214 illustrated in FIG. 2 enjoys a number of advantages when compared to the further embodiments of the invention illustrated in FIGS. 3–5 and to be more fully described below. More specifically, since the screened subnet 200 utilizes existing firewalls, specifically, the first and second firewalls 206 and 208, the screened subnet 200 may be implemented with relative ease and minimal additional cost. Furthermore, since it hangs off of the second firewall 208, the shared secured utility VLAN 214 would also be readily accessible to the various servers of weak back VLAN 224 and the strong VLAN 226. On the other hand, factors which weigh against implementation of the screened subnet 200 of FIG. 2 would include a significant increase in overhead for the second firewall 208 and a single potential point of failure, specifically, the second firewall 208, for the entire shared secured utility VLAN 214.

Figure 3:
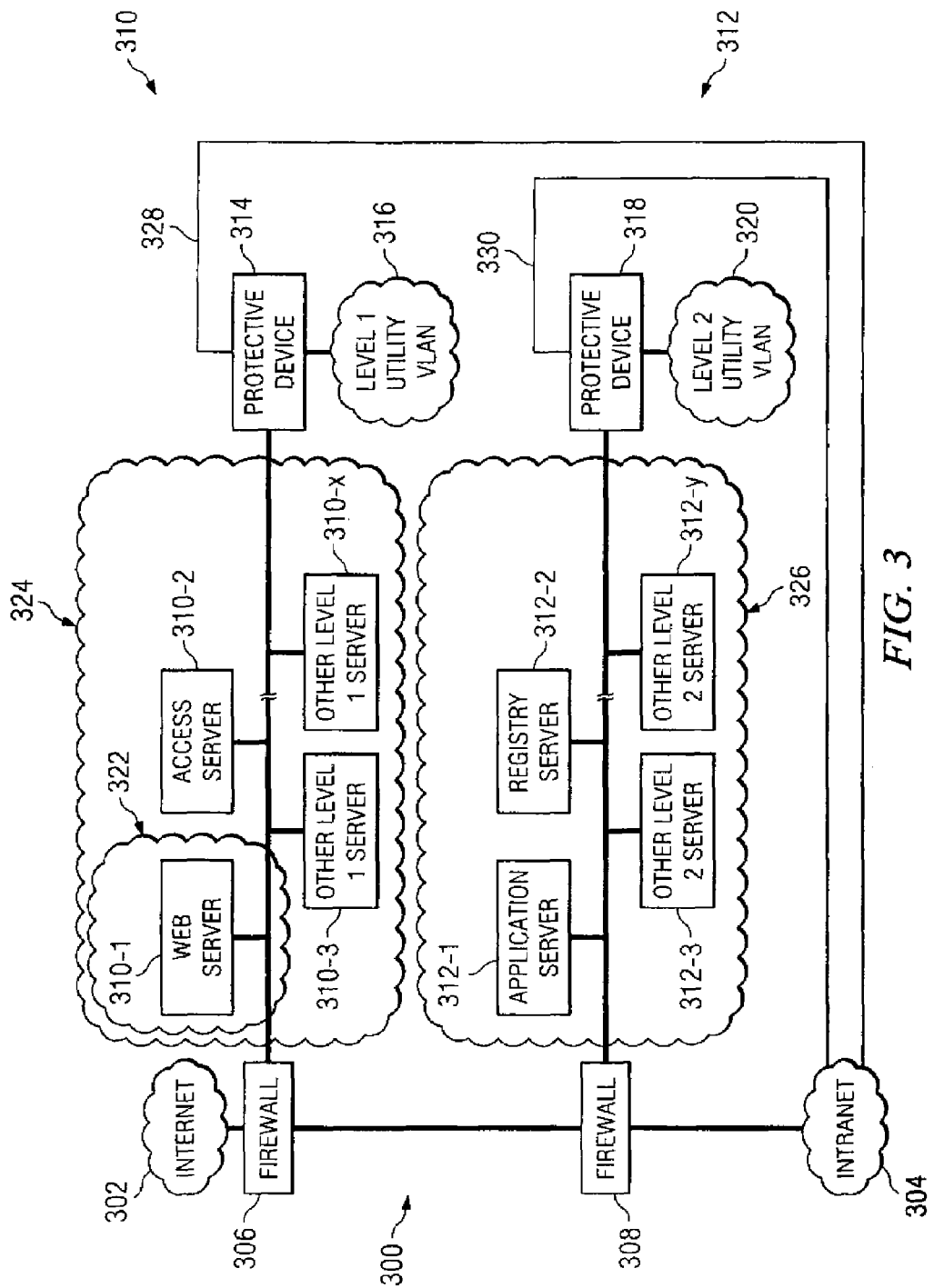
FIG. 3 is a block diagram of a second, dual secured utility VLAN, embodiment of a screened subnet constructed in accordance with the teachings of the present invention.

Referring next to FIG. 3, a screened subnet constructed in accordance with a second embodiment of the present invention will now be described in greater detail. As may now be seen, a screened subnet 300 interconnects a first network 302, for example, the Internet or another network utilizing the TCP/IP set of communication protocols and a second network 304, for example, an intranet or another network utilizing the TCP/IP set of communication protocols. Remote users accessing the intranet 304 through the Internet 302 are connected through the screened subnet 300. As disclosed herein, the Internet 302 is presumed to be an untrusted network, the intranet 304 is presumed to be a trusted network, for example, an enterprise network, and the screened subnet 300 serves to protect the intranet 304 from hostile attacks originating from the Internet 302. Of course, it should be clearly understood that screened subnets such as the screened subnet 300 are often used to interconnect a first untrusted network to a second untrusted network. Accordingly, it is fully contemplated that the screened subnet 300 may be used to interconnect any number of trusted and/or untrusted networks to one another.

The screened subnet 300 includes first and second protective devices 306 and 308, preferably, first and second firewalls, coupled to one another. Typically, the first and second firewalls 306 and 308 are implemented through a combination of routers for allowing or denying packets based on the source/destination address of the port number and/or hosts for controlling traffic at the application level. The screened subnet 300 further includes first and second subnets 310 and 312, each comprised of one or more servers or other computer systems 310-1 through 310-$x$, 312-1 through 312-$y$, respectively, and protected from the Internet 302 by the first and second firewalls 306 and 308, respectively. As illustrated in FIG. 3, the first, or level 1, subnet 310 includes a web server 310-1, an access server 310-2 and any number of additional level 1 servers 310-3 through 310-$x$. Of these, the web server 310-1 maintains content which may be viewed by users accessing the web server 310-1 via the Internet 302. Typically, the other level 1 servers 310-3 through 310-$x$ of the first subnet 310 will also include one or more mirrored servers (not shown) of the web server 310-1.

As disclosed herein, the web server 310-1 maintains two types of content—unrestricted and restricted. If a user seeks to view restricted content maintained by the web server 310-1, that user shall be re-directed to the access server 310-2 for execution of an authentication and/or authorization session. Depending on the number of users seeking to view restricted content, the other level 1 servers 310-3 through 310-$x$ of the first subnet 310 may include any number of additional access servers (not shown). Of course, the web server 310-1 may, in the alternative, exclusively maintain unrestricted content or exclusively maintain restricted content.

The second, or level 2, subnet 312 includes an application server 312-1, a registry server 312-2 and any number of other level 2 servers 312-3 through 312-$y$. Typically, the application server 312-1 functions in support of the web server 310-1. For example, if the content maintained by the web server 310-1 enables the user accessing the content to execute an application, the web server 310-1 would transport the user's commands to the application server 312-1 for execution. The application server 312-1 would then return the results to the web server 310-1 for viewing. Although, in the embodiment of the invention illustrated in FIG. 3, a single application server 312-1 capable of being accessed by the web server 310-1 is shown, it is fully contemplated that any number of application servers accessible by the web server 310-1 may form part of the second subnet 312. The registry server 312-2 functions in support of the access server 310-2. More specifically, information collected by the access server 310-2 upon initiation of a process to authenticate and/or authorize a user is transported to the registry server 312-2 for analysis. For example, the registry server 312-2 may compare a password or other identifying information received from the access server 310-2 to entries maintained in a database (not shown) located within the intranet 304 to determine whether the user providing the password or other identified information should be granted the requested access. Again, depending on the number of users seeking to view restricted content, the other level 2 servers 312-3 through 312-$y$ may include any number of additional registry servers (not shown).

Broadly speaking, the first firewall 306 provides a first level of protection to a portion of the first subnet 310 and the second subnet 312 by protecting the servers residing on that portion of the first subnet 310, the servers residing on the second subnet 312, as well as any other computer systems or other devices forming part of the intranet 304, from unauthorized accesses by unauthorized users. Similarly, the second firewall 308 provides a second level of protection to the second subnet 312 by protecting the servers residing on the second subnet 312, as well as any other computer systems or other devices forming part of the intranet 304, from unauthorized accesses by unauthorized users. As the second subnet 312 enjoys an additional level of protection relative to the first subnet 310, the second subnet 312 is often referred to as being the "stronger" of the two while the first subnet 310 is often referred to as the "weaker" of the two.

As previously set forth, the first and second firewalls 306 and 308 operate by controlling traffic, typically, by rejecting the traffic or routing it to selected destinations. Based upon how the first and second firewalls 306 and 308 control traffic, the various servers forming the first and second subnets 310 and 312 may be further classified. More specifically, the first firewall 306 directs a user accessing the screened subnet 300 from the Internet 302 to the web server 310-1. The first firewall 306 will not, however, allow that user to access any of the other servers 310-2 through 310-x forming part of the first subnet 310, any of the servers forming part of the second subnet 312 nor any of the servers forming part of the intranet 304. Accordingly, as the first firewall 306 has, in effect, segregated the web server 310-1 from the remainder of the first subnet 310, the first subnet 310 may be viewed as being comprised of a front weak VLAN 322 comprised of the web server 310-1 (and any mirrored web servers not shown in FIG. 3) and a back weak VLAN 324 comprised of the remaining servers forming part of the first subnet 310.

The second firewall 308 does not segregate the various servers 312-1 through 312-y forming the second subnet 312 by directing incoming traffic to a specific server or servers thereof. Rather, the second firewall 308 will allow traffic originating from servers located within the front weak VLAN 322 or the back weak VLAN 324 to travel to servers located within the strong VLAN 326 to which the traffic had been addressed. Thus, the second firewall 308 will allow traffic from the web server 310-1 to travel to the application server 312-1. The second firewall 308 will further allow traffic from the access server 310-2 to travel to the registry server 312-2. The second firewall 308 will, however, block traffic originating on the Internet 302 from both the second subnet 312 and the intranet 304 and block traffic originating on either the front weak VLAN 322 or the back weak VLAN 324 from the intranet 304 Accordingly, the various servers 312-1 through 312-y forming the second subnet 312 may be viewed as comprising a strong VLAN 326. The second firewall 308 does, however, segregate the strong VLAN 326 from the intranet 304. Thus, any server accessible to one of the servers forming part of either the front weak VLAN 322 or the back weak VLAN 324 through the second firewall 308 should be view as forming part of the strong VLAN 326 while those servers which cannot be accessed by one of the servers forming part of either the front weak VLAN 322 or the back weak VLAN 324 should be viewed as forming part of the intranet 304.

Continuing to refer to FIG. 3, the screened subnet 300 further includes a first secured utility VLAN 316 and a second secured utility VLAN 320. The first secured utility VLAN 316 is coupled to the first subnet 310 by a third protective device 314 while the second secured utility VLAN 320 is coupled to the second subnet 312 by a fourth protective device 318. The first secured utility VLAN 316 is comprised of one or more servers which collectively provide all of the utility services to the various servers included in the weak back VLAN 324. Similarly, the second secured utility VLAN 320 is comprised of one or more servers which collectively provide all of the utility services to the various servers included in the strong VLAN 326. Thus, all utility services for the weak back VLAN 324 and the strong VLAN 326 are segregated from each other, from the weak back VLAN 324 and the strong VLAN 326 which they respectively serve and from the remainder of the subnet 300.

The first secured utility VLAN 316 is comprised of one or more servers configured to provide various services such as maintenance, reporting, backup, logging or other services, in support of one or more of the access server 310-2 and/or the other level 1 servers 310-3 through 310-x included in the weak back VLAN 324 while the second secured utility VLAN 320 is comprised of one or more servers configured to provide various services such as maintenance, reporting, backup, logging or other services, in support of one or more of the application server 312-1, the registry server 312-2 and/or the other level 2 servers 312-3 through 312-y included in the strong VLAN 326. As before, the configuration of the server or servers which comprise the first and second secured utility VLANs 316 and 320 is not disclosed in further detail, however, since it may vary depending on the particular utility services to be provided thereby and/or the particular level 1 or level 2 servers for which utility services are to be respectively provided thereby.

In the past, the server or servers providing utility services for servers located in the screened subnet, for example, the utility servers 110-3 and 112-3 which provided utility services for the servers 110-2 through 110-x and 112-1 through 112-y of the first and second subnets 110 and 112, respectively, of the screened subnet 100, were at risk of being vandalized, manipulated or otherwise compromised by unauthorized users. The embodiment of the present invention illustrated in FIG. 3 provides an additional level of protection for those servers providing utility or maintenance service to the weak back VLAN 324 and the strong VLAN 326. More specifically, after segregating, within the first secured utility VLAN 316, those servers providing utility services to the weak back VLAN 324, the first secured utility VLAN 316 is provided with an additional level of protection relative to the servers for which it provides utility or maintenance services therefore. The additional level of protection is achieved by coupling the first secured utility VLAN 316 to the weak back VLAN 324 through the third protective device 314. Similarly, after segregating, within the second secured utility VLAN 320, those servers providing utility or maintenance service to the strong VLAN 326, the second secured utility VLAN 318 is provided with an additional level of protection relative to the servers to which it provides utility or maintenance services therefore, here, by coupling the second secured utility VLAN 320 to the strong VLAN 326 through the fourth protective device 318.

When constructed in the manner illustrated in FIG. 3, utility traffic from the various servers of the weak back VLAN 324 would flow through the third protective device 314 and on to the first secured utility VLAN 316. Conversely, traffic from the first secured utility VLAN 316 would flow through the third protective device 314 and on to the weak back VLAN 324. Bi-directional traffic, typically for administrative and data purposes, between the first secured utility VLAN 316 and the intranet 304 is provided by a direct connection between the intranet 304 and the third protective device 314 using ling 328. By utilizing the link 328, the system administrator may readily access the first secured utility VLAN 316 while avoiding the first firewall 306, thereby avoiding any increased vulnerability to the first subnet 310 which results from providing an additional path through the first firewall 306.

Similarly, utility traffic from the various servers of the strong VLAN 326 would flow through the fourth protective device 318 and on to the second secured utility VLAN 320. Conversely, traffic from the second secured utility VLAN 320 would flow through the fourth protective device 318 and on to the strong VLAN 326. Bi-directional traffic, typically for administrative and data purposes, between the second secured utility VLAN 320 and the intranet 304 is provided by a direct connection between the intranet 304 and the fourth protective device 318 using link 330. By utilizing the link 330, the system administrator may readily access the second secured utility VLAN 320 while avoiding the second firewall 308, thereby avoiding any increased vulnerability to the second subnet 312 which results from providing an additional path through the second firewall 308.

While, for the various reasons set forth above, the use of the first and second secured utility VLANs 316 and 320 enhance the security of the server or servers providing utility services for the weak back VLAN 324 and the strong VLAN 326, respectively, it is further contemplated that a variety of other benefits are achievable through use of the first and second secured utility VLANs 316 and 320. More specifically, by segregating the various utility and maintenance servers which collectively comprise the first and second secured utility VLANs 316 and 320, respectively, performance of the utility functions for the weak back VLAN 324 and the strong VLAN 326 may again improve as a result of the centralization of these functions within the first and second secured utility VLANs 316 and 320, respectively. For example, if all of the maintenance, reporting, backup, logging and other utility services to be provided to the weak back VLAN 324 reside within the first secured utility VLAN 316, the utility services for the weak back VLAN 324 will be segregated from normal business traffic of the first subnet 310. As a result, the available power of the servers residing in the first secured utility VLAN 316 which provide such utility services should increase dramatically. Further by way of example, if all of the maintenance, reporting, backup, logging and other utility services to be provided to the strong VLAN 326 reside within the second secured utility VLAN 320, the utility services for the strong VLAN 326 will be segregated from normal business traffic of the second subnet 312. As a result, the available power of the servers residing in the second secured utility VLAN 320 which provide such utility services should also increase dramatically. It should be noted, however, as two discrete secured utility VLANs are provided, the resultant setup, maintenance and troubleshooting may be complicated somewhat. Further, the use of multiple secured utility VLANs may result in the use of duplicate utility servers, one to provide certain services to the weak back VLAN 324 and the other to provide the identical services to the strong VLAN 326.

It is further contemplated that, by funneling all utility traffic for the weak back VLAN 324 and the strong VLAN 326 to the first and second utility VLANs 316 and 320, respectively, the ability of the system administrator for the screened subnet 200, as well as the intranet 204 which it protects, to perform traffic analysis, capacity planning and other administrative tasks will be enhanced by providing respective single points from which all utility traffic for the weak back VLAN and the strong VLAN 324 and 326, respectively, may be measured. The ability of the system administrator to perform these tasks is further enhanced by the direct links 328 and 330 between the intranet 304 and the first and second secured utility VLANs 316 and 320, respectively.

In one embodiment of the invention, it is contemplated that both the third protective device 314 and the fourth protective device 318 are choke routers. In another embodiment of the invention, it is contemplated that both the third protective device 314 and the fourth protective device 318 are firewalls. In still another embodiment of the invention, it is contemplated that the third protective device 314 is a firewall and the fourth protective device 318 is a choke router. Finally, in still yet another embodiment of the invention, it is contemplated that the third protective device 314 is a choke router and the fourth protective device 318 is a firewall.

When weighing the relative merits of these four distinct embodiments of a screened subnet having a pair of secured utility VLANs, various considerations support the use of a choke router for one or both of the third and fourth protective devices 314 and 318. For example, a choke router typically results in better performance, an established router support group and a standardized configuration. Furthermore, the use of a choke router is typically more economical, enjoys a standardized configuration, can be deployed faster and is easier to maintain than the much more complicated firewall. However, other considerations should also be taken into account before selecting a choke router as one or both of the third and fourth protective devices 314 and 318. For example, the use of a choke router adds to the number of routers requiring support and requires the definition and maintenance of access control lists. Furthermore, choke routers lack an established change process, have limited security services/functionality, are limited to packet filtering and cannot inspect by state. Finally, misconfigurations of choke routers can lead to inappropriate traffic flows.

Of course, still other considerations support the use of a firewall for one or more of the third and fourth protective devices 314 and 318. More specifically, when compared to choke change processes and have established support. However, other considerations should also be taken into account before selecting a firewall as one or both of the third and fourth protective devices 314 and 318. For example, the deployment of a firewall tends to take longer and is more expensive than the deployment of a choke router. Firewalls also tend to be more complicated to configure and maintain. While more expansive than the security functionality of the choke router, the software-based security functionality of a firewall is slower. Finally, if misconfigured, a firewall is vulnerable to attack.

Figure 4:
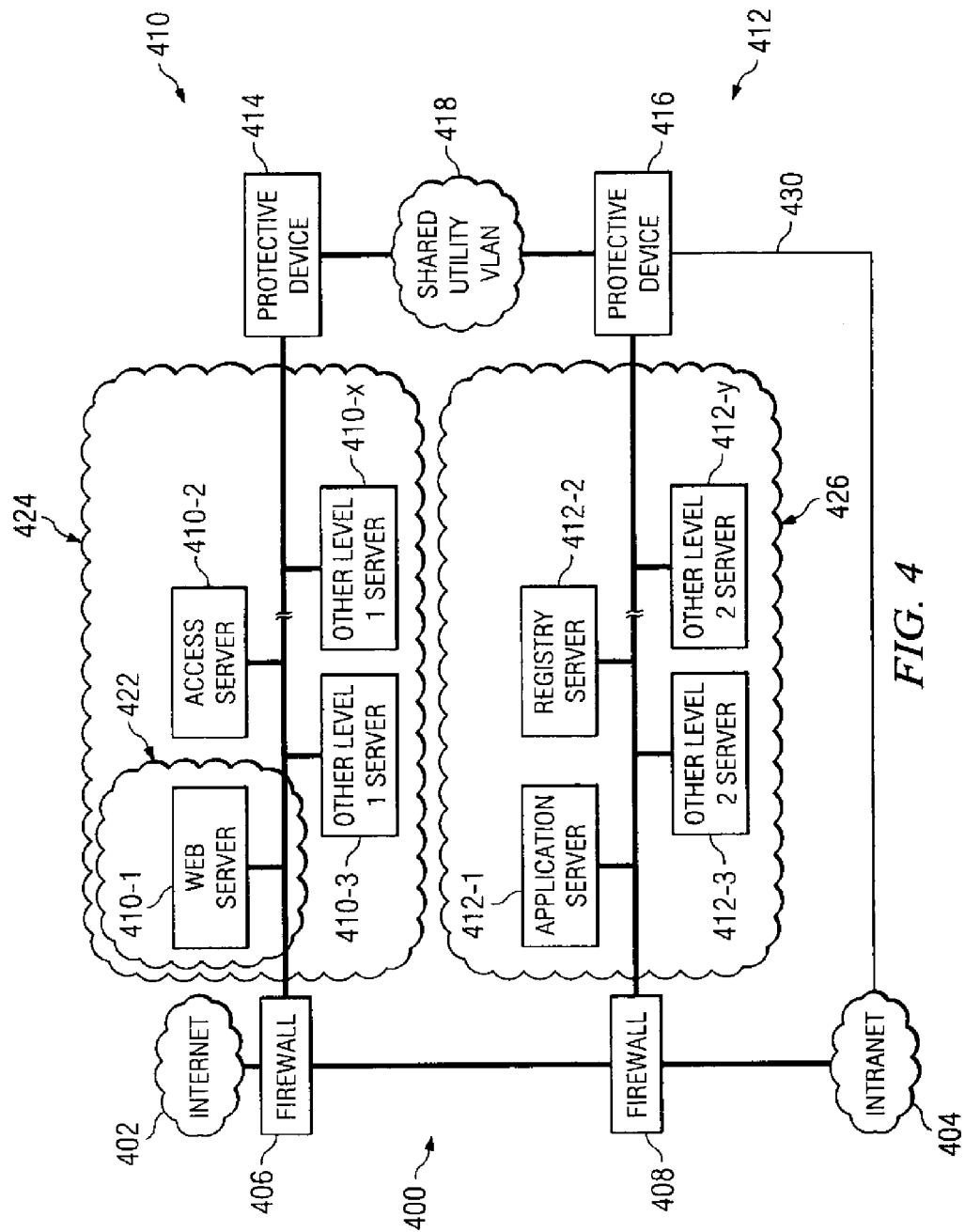
FIG. 4 is a block diagram of a third, single secured utility VLAN, embodiment of a screened subnet constructed in accordance with the teachings of the present invention.

Referring next to FIG. 4, a screened subnet constructed in accordance with a third embodiment of the present invention will now be described in greater detail. As may now be seen, a screened subnet 400 interconnects a first network 402, for example, the Internet or another network utilizing the TCP/IP set of communication protocols and a second network 404, for example, an intranet or another network utilizing the TCP/IP set of communication protocols. Remote users accessing the intranet 404 through the Internet 402 are connected through the screened subnet 400. As disclosed herein, the Internet 402 is presumed to be an untrusted network, the intranet 404 is presumed to be a trusted network, for example, an enterprise network, and the screened subnet 400 serves to protect the intranet 404 from hostile attacks originating from the Internet 402. Of course, it should be clearly understood that screened subnets such as the screened subnet 400 are often used to interconnect a first untrusted network to a second untrusted network. Accordingly, it is fully contemplated that the screened subnet 400 may be used to interconnect any number of trusted and/or untrusted networks to one another.

The screened subnet 400 includes first and second protective devices 406 and 408, preferably, first and second firewalls, coupled to one another. Typically, the first and second firewalls 406 and 408 are implemented through a combination of routers for allowing or denying packets based on the source/destination address of the port number and/or hosts for controlling traffic at the application level. The screened subnet 400 further includes first and second subnets 410 and 412, each comprised of one or more servers or other computer systems 410-1 through 410-x, 412-1 through 412-y, respectively, and screened from the Internet 402 by the first and second firewalls 406 and 408, respectively. As illustrated in FIG. 4, the first, or level 1, subnet 410 includes a web server 410-1, an access server 410-2 and any number of additional level 1 servers 410-3 through 410-x. Of these, the web server 410-1 maintains content which may be viewed by users accessing the web server 410-1 via the Internet 402. Typically, the other servers 410-3 through 410-x of the first subnet 410 will also include one or more mirrored servers (not shown) of the web server 410-1.

As disclosed herein, the web server 410-1 maintains two types of content—unrestricted and restricted. If a user seeks to view restricted content maintained by the web server 410-1, that user shall be re-directed to the access server 410-2 for execution of an authentication and/or authorization session. Depending on the number of users seeking to view restricted content, the other level 1 servers 410-3 through 410-x of the first subnet 410 may include any number of additional access servers (not shown). Of course, the web server 410-1 may, in the alternative, exclusively maintain unrestricted content or exclusively maintain restricted content.

The second, or level 2, subnet 412 includes an application server 412-1, a registry server 412-2 and any number of other level 2 servers 412-3 through 412-y. Typically, the application server 412-1 functions in support of the web server 410-1. For example, if the content maintained by the web server 410-1 enables the user accessing the content to execute an application, the web server 410-1 would transport the user's commands to the application server 412-1 for execution. The application server 412-1 would then return the results to the web server 410-1 for viewing. Although, in the embodiment of the invention illustrated in FIG. 4, a single application server 412-1 capable of being accessed by the web server 410-1 is shown, it is fully contemplated that any number of application servers accessible by the web server 410-1 may form part of the second subnet 412. The registry server 412-2 functions in support of the access server 410-2. More specifically, information collected by the access server 410-2 upon initiation of a process to authenticate and/or authorize a user is transported to the registry server 412-2 for analysis. For example, the registry server 412-2 may compare a password or other identifying information received from the access server 410-2 to entries maintained in a database (not shown) located within the intranet 404 to determine whether the user providing the password or other identified information should be granted the requested access. Again, depending on the number of users seeking to view restricted content, the other level 2 servers 412-3 through 412-y may include any number of additional registry servers (not shown).

Broadly speaking, the first firewall 406 provides a first level of protection to the first subnet 410 and the second subnet 412 by protecting the servers residing on the first subnet 410, the servers residing on the second subnet 412, as well as any other computer systems or other devices forming part of the intranet 404, from unauthorized accesses by unauthorized users. Similarly, the second firewall 408 provides a second level of protection to the second subnet 412 by protecting the servers residing on the second subnet 412, as well as any other computer systems or other devices forming part of the intranet 404, from unauthorized accesses by unauthorized users. As the second subnet 412 enjoys an additional level of protection relative to the first subnet 410, the second subnet 412 is often referred to as being the "stronger" of the two while the first subnet 410 is often referred to as the "weaker" of the two.

As previously set forth, the first and second firewalls 406 and 408 operate by controlling traffic, typically, by rejecting the traffic or routing it to selected destinations. Based upon how the first and second firewalls 406 and 408 control traffic, the various servers forming the first and second subnets 410 and 412 may be further classified. More specifically, the first firewall 406 directs a user accessing the screened subnet 400 from the Internet 402 to the web server 410-1. The first firewall 406 will not, however, allow that user to access any of the other servers 410-2 through 410-x forming part of the first subnet 410, any of the servers forming part of the second subnet 412 nor any of the servers forming part of the intranet 404. Accordingly, as the first firewall 406 has, in effect, segregated the web server 410-1 from the remainder of the first subnet 410, the first subnet 410 may be viewed as being comprised of a front weak VLAN 422 comprised of the web server 410-1 (and any mirrored web servers not shown in FIG. 1) and a back weak VLAN 424 comprised of the remaining servers forming part of the first subnet 410.

The second firewall 408 does not segregate the various servers 412-1 through 412-y forming the second subnet 412 by directing incoming traffic to a specific server or servers thereof. Rather, the second firewall 408 will allow traffic originating from servers located within the front weak VLAN 422 or the back weak VLAN 424 to travel to servers located within the strong VLAN 426 to which the traffic had been addressed. Thus, the second firewall 408 will allow traffic from the web server 410-1 to travel to the application server 412-1. The second firewall 408 will further allow traffic from the access server 410-2 to travel to the registry server 412-2. The second firewall 408 will, however, block traffic originating on the Internet 402 from both the second subnet 412 and the intranet 404 and block traffic originating on either the front weak VLAN 422 or the back weak VLAN 424 from the intranet 404 Accordingly, the various servers 412-1 through 412-y forming the second subnet 412 may be viewed as comprising a strong VLAN 426. The second firewall 408 does, however, segregate the strong VLAN 426 from the intranet 404. Thus, any server accessible to one of the servers forming part of either the front weak VLAN 422 or the back weak VLAN 424 through the second firewall 408 should be view as forming part of the strong VLAN 426 while those servers which cannot be accessed by one of the servers forming part of either the front weak VLAN 422 or the back weak VLAN 424 should be viewed as forming part of the intranet 404.

Continuing to refer to FIG. 4, the screened subnet 400 further includes a secured utility VLAN 418 coupled to the first subnet 410 by a third protective device 414 and coupled to the second subnet 412 by a fourth protective device 416. The secured utility VLAN 418 may be further characterized as a shared secured utility VLAN since the utility servers which provide all of the utility services to the various servers forming part of both the weak back VLAN 424 and the strong VLAN 426 reside therein. Thus, all utility services for the weak back VLAN 224 and the strong VLAN 426 are segregated from the remainder of the subnet 400. The shared secured utility VLAN 418 is comprised of one or more configured to provide various services such as maintenance, reporting, backup, logging or other services, in support of one or more of the access server 410-2, the other level 1 servers 410-3 through 410-x, the application server 412-1, the registry server 412-2 and/or the other level 2 servers 412-3 through 412-y. As before, the configuration of the server or servers which comprise the shared secured utility VLAN 418 is not disclosed in further detail, however, since it may vary depending on the particular utility services to be provided thereby and/or the particular level 1 or level 2 servers for which utility services are to be respectively provided thereby.

In the past, the server or servers providing utility services for servers located in the screened subnet, for example, the utility servers 110-3 and 112-3 which provided utility services for the servers of the weak back VLAN 124 and the strong VLAN 126, respectively, of the screened subnet 100, were at risk of being vandalized, manipulated or otherwise compromised by unauthorized users. The embodiment of the present invention illustrated in FIG. 4 provides an additional level of protection for those servers providing utility or maintenance service to the weak back VLAN 424 and the strong VLAN 426. More specifically, after segregating, within the shared secured utility VLAN 418, those servers providing utility services to the weak back VLAN 424 and the strong VLAN 426, the shared secured utility VLAN 418 is provided with an additional level of protection relative to the servers for which it provides utility or maintenance services therefore. The additional level of protection is achieved by coupling the shared secured utility VLAN 418 to the weak back VLAN 424 through the third protective device 414 and to the strong VLAN 426 through the fourth protective device 416.

When constructed in the manner illustrated in FIG. 4, utility traffic from the various servers of the weak back VLAN 424 would flow through the third protective device 414 and on to the shared secured utility VLAN 416. Conversely, utility traffic from the shared secured utility VLAN 416 would flow through the third protective device 414 and on to the weak back VLAN 424. Similarly, utility traffic from the various servers of the strong VLAN 426 would flow through the fourth protective device 416 and on to the shared secured utility VLAN 418. Conversely, utility traffic from the shared secured utility VLAN 418 would flow through the fourth protective device 416 and on to the strong VLAN 426.

Bi-directional traffic, typically for administrative and data purposes, between the shared secured VLAN 418 and the intranet 404 is provided by a direct connection between the intranet 404 and the fourth protective device 416 using link 430. By utilizing the link 430, the system administrator may readily access the shared secured utility VLAN 418 while avoiding the first and second/or firewalls 406 and 408, thereby avoiding any increased vulnerability to the first subnet 410 and/or the second subnet 412 which results from providing additional paths through the first firewall 406 and/or the second firewall 408. Of course, while FIG. 4 shows the intranet 404 being coupled to the shared secured utility VLAN 418 through the fourth protective device 416, it should be clearly understood that the intranet 404 may instead be coupled to the shared secured utility VLAN 418 through the third protective device 414. Such an alternate configuration may, however, lead to increased vulnerability of the shared secured utility VLAN 418. Of course, appropriate selection of the third and fourth protective devices 414 and 416 may, however, mitigate such increased vulnerability somewhat.

While, for the various reasons set forth above, the use of the shared secured utility VLAN 418 enhance the security of the server or servers providing utility services for the weak back VLAN 324 and the strong VLAN 326, it is further contemplated that a variety of other benefits are achievable through use of the shared secured utility VLAN 418. More specifically, by segregating the various utility and maintenance servers which collectively comprise the shared secured utility VLAN 418, performance of the utility functions may improve as a result of the centralization of these functions within the shared secured utility VLAN 418. For example, if all maintenance, reporting, backup, logging and other utility services to be provided to the weak back VLAN 424 and the strong VLAN 426 reside within the shared secured utility VLAN 418, the utility services will be segregated from the normal business traffic for the first and second subnets 410 and 412. As a result, the available power of the servers residing in the shared secured utility VLAN 418 which provide such utility services should increase dramatically. Still further benefits are achieved by the use of a shared secured utility VLAN, for example, the shared secured utility VLAN 418, in a screened subnet rather than a pair of secured utility VLANs, for example, the first and second secured utility VLANs 316 and 320. More specifically, it is contemplated that setup, maintenance and troubleshooting of the screened subnet shall be easier when the screened subnet includes a shared secured utility VLAN. Further, the use of duplicate servers can be avoided since a single utility server can serve both the weak back VLAN 424 and the strong VLAN 426.

It is further contemplated that, by funneling all utility traffic for both the weak back VLAN and the strong VLAN to a single shared secured utility VLAN, for example, the shared secured VLAN 418, rather than to respective secured utility VLANs, for example, the first and second secured utility VLANs 316 and 320, the ability of the system administrator for the screened subnet 200, as well as the intranet 204 which it protects, to perform traffic analysis, capacity planning and other administrative tasks will be even more enhanced by providing respective a single point from which all utility traffic for both the weak back VLAN and the strong may be measured. The ability of the system administrator to perform these tasks is further enhanced by the need for only one direct link, more specifically, the link 430, between the intranet 304 and the shared secured utility VLAN 418.

In addition to the aforementioned advantages obtained when using a shared secured utility VLAN, when weighing the relative merits of the use of a shared secured utility VLAN in which utility services for both the weak back VLAN and the strong VLAN are segregated or, in the alternative, the use of first and second secured utility VLAN in which utility services for the weak back VLAN and the strong VLAN are respectively segregated, a variety of other considerations may also be taken into account. A number of these considerations support the use of a shared secured utility VLAN. Generally, the use of a shared secured utility VLAN is considered to be more economical. For example, the use of a shared secured utility VLAN will centralize the provided utility services, reduce requirements for hardware and software support and reduce requirements for maintenance and administrative support. On the other hand, a shared secured utility VLAN typically takes longer to deploy, poses a greater security risk and is vulnerable to a single point failure. Other considerations support the use of a pair of secured utility VLANs. For example, a pair of secured utility VLANs can be deployed faster, pose less of a security risk and avoid the vulnerability of having a single point of failure. Conversely, due to both the additional equipment required and the decentralization of the utility services provided thereby, a pair of secured utility VLANs tend to be more costly to install and support.

In one embodiment of the invention, it is contemplated that both the third protective device 414 and the fourth protective device 416 are choke routers. In another embodiment of the invention, it is contemplated that both the third protective device 414 and the fourth protective device 416 are firewalls. In still another embodiment of the invention, it is contemplated that the third protective device 414 is a firewall and the fourth protective device 416 is a choke router. Finally, in still yet another embodiment of the invention, it is contemplated that the third protective device 414 is a choke router and the fourth protective device 416 is a firewall.

When weighing the relative merits of these four distinct embodiments of a screened subnet having a pair of secured utility VLANs, various considerations support the use of a choke router for one or both of the third and fourth protective devices 414 and 316. For example, a choke router typically results in better performance, an established router support group and a standardized configuration. Furthermore, the use of a choke router is typically more economical, enjoys a standardized configuration, can be deployed faster and is easier to maintain than the much more complicated firewall. However, other considerations should also be taken into account before selecting a choke router as one or both of the third and fourth protective devices 414 and 416. For example, the use of a choke router adds to the number of routers requiring support and requires the definition and maintenance of access control lists. Furthermore, choke routers lack an established change process, have limited security services/functionality, are limited to packet filtering and cannot inspect by state. Finally, misconfigurations of choke routers can lead to inappropriate traffic flows.

Of course, still other considerations support the use of a firewall for one or more of the third and fourth protective devices 414 and 416. More specifically, when compared to choke routers, firewalls enjoy enhanced security functionality, allow inspection by state, have defined change processes and have established support. However, other considerations should also be taken into account before selecting a firewall as one or both of the third and fourth protective devices 414 and 416. For example, the use of a firewall tends takes longer and is more expensive to deploy. Firewalls also tend to be more complicated to configure and maintain. While more expansive than the security functionality of the choke router, the software-based security functionality of a firewall is slower. Finally, if misconfigured, a firewall is vulnerable to attack.

Figure 5:
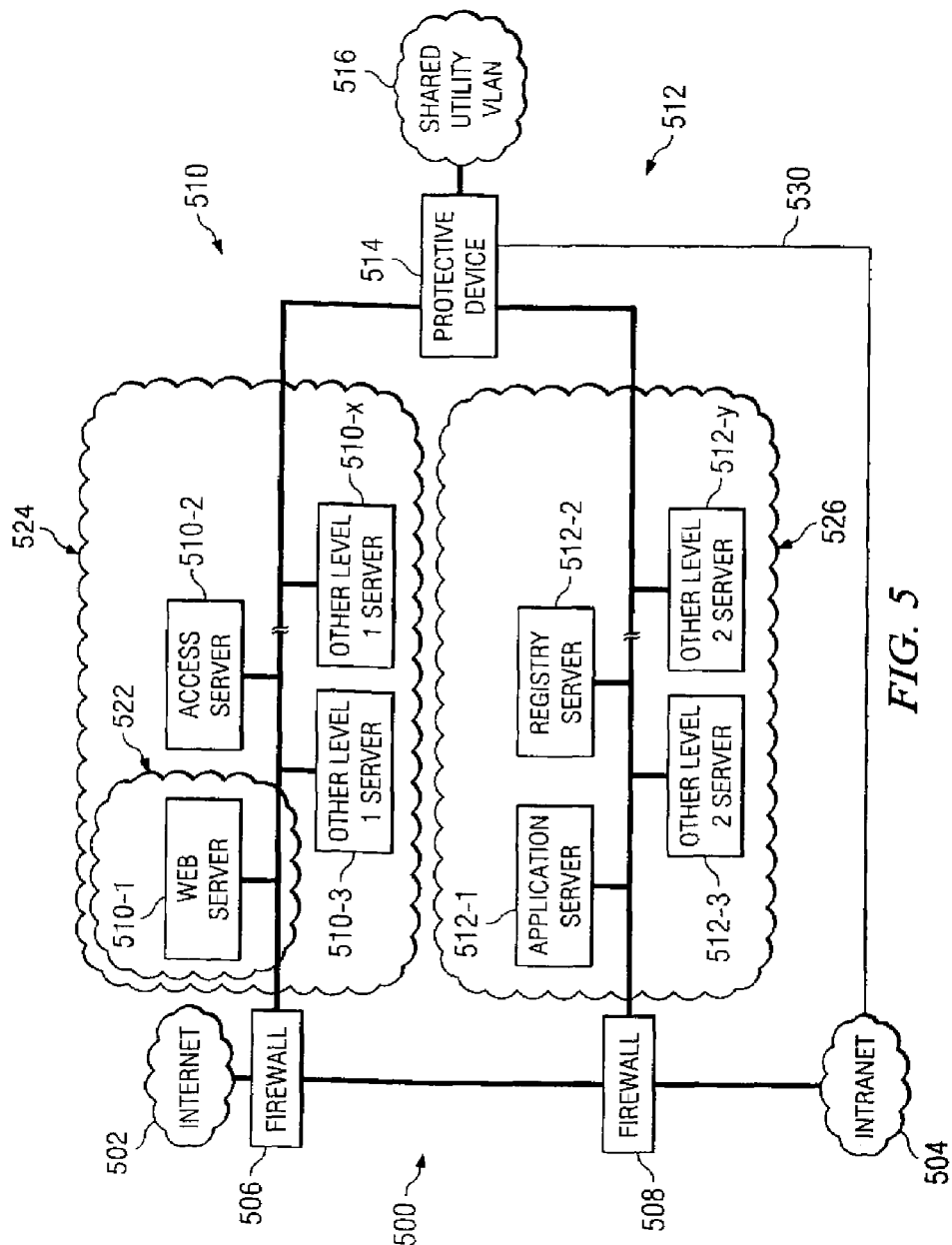
FIG. 5 is a block diagram of a fourth, single secured utility VLAN, embodiment of a screened subnet constructed in accordance with the teachings of the present invention.

Referring next to FIG. 5, a screened subnet constructed in accordance with a fourth embodiment of the present invention will now be described in greater detail. As may now be seen, a screened subnet 500 interconnects a first network 502, for example, the Internet or another network utilizing the TCP/IP set of communication protocols and a second network 504, for example, an intranet or another network utilizing the TCP/IP set of communication protocols. Remote users accessing the intranet 504 through the Internet 502 are connected through the screened subnet 500. As disclosed herein, the Internet 502 is presumed to be an untrusted network, the intranet 504 is presumed to be a trusted network, for example, an enterprise network, and the screened subnet 500 serves to protect the intranet 504 from hostile attacks originating from the Internet 502. Of course, it should be clearly understood that screened subnets such as the screened subnet 500 are often used to interconnect a first untrusted network to a second untrusted network. Accordingly, it is fully contemplated that the screened subnet 500 may be used to interconnect any number of trusted and/or untrusted networks to one another.

The screened subnet 500 includes first and second protective devices 506 and 508, preferably, first and second firewalls, coupled to one another. Typically, the first and second firewalls 506 and 508 are implemented through a combination of routers for allowing or denying packets based on the source/destination address of the port number and/or hosts for controlling traffic at the application level. The screened subnet 500 further includes first and second subnets 510 and 512, each comprised of one or more servers or other computer systems 510-1 through 510-x, 512-1 through 512-y, respectively, and protected from the Internet 502 by the first and second firewalls 506 and 508, respectively. As illustrated in FIG. 4, the first, or level 1, subnet 510 includes a web server 510-1, an access server 510-2 and any number of additional level 1 servers 510-3 through 510-x. Of these, the web server 510-1 maintains content which may be viewed by users accessing the web server 510-1 via the Internet 502. Typically, the other servers 510-3 through 510-x of the first subnet 510 will also include one or more mirrored servers (not shown) of the web server 510-1.

As disclosed herein, the web server 510-1 maintains two types of content—unrestricted and restricted. If a user seeks to view restricted content maintained by the web server 510-1, that user shall be re-directed to the access server 510-2 for execution of an authentication and/or authorization session. Depending on the number of users seeking to view restricted content, the other level 1 servers 510-3 through 510-x of the first subnet 510 may include any number of additional access servers (not shown). Of course, the web server 510-1 may, in the alternative, exclusively maintain unrestricted content or exclusively maintain restricted content.

The second, or level 2, subnet 512 includes an application server 512-1, a registry server 512-2 and any number of other level 2 servers 512-3 through 512-y. Typically, the application server 512-1 functions in support of the web server 510-1. For example, if the content maintained by the web server 510-1 enables the user accessing the content to execute an application, the web server 510-1 would transport the user's commands to the application server 512-1 for execution. The application server 512-1 would then return the results to the web server 510-1 for viewing. Although, in the embodiment of the invention illustrated in FIG. 5, a single application server 512-1 capable of being accessed by the web server 510-1 is shown, it is fully contemplated that any number of application servers accessible by the web server 510-1 may form part of the second subnet 512. The registry server 512-2 functions in support of the access server 510-2. More specifically, information collected by the access server 510-2 upon initiation of a process to authenticate and/or authorize a user is transported to the registry server 512-2 for analysis. For example, the registry server 512-2 may compare a password or other identifying information received from the access server 510-2 to entries maintained in a database (not shown) located within the intranet 504 to determine whether the user providing the password or other identified information should be granted the requested access. Again, depending on the number of users seeking to view restricted content, the other level 2 servers 512-3 through **512-*y*** may include any number of additional registry servers (not shown).

Broadly speaking, the first firewall 506 provides a first level of protection to a first portion of the first subnet 510 and to the second subnet 512 by protecting the servers residing on that portion of the first subnet 510, the servers residing on the second subnet 512, as well as any other computer systems or other devices forming part of the intranet 504, from unauthorized accesses by unauthorized users. Similarly, the second firewall 508 provides a second level of protection to the second subnet 512 by protecting the servers residing on the second subnet 512, as well as any other computer systems or other devices forming part of the intranet 504, from unauthorized accesses by unauthorized users. As the second subnet 512 enjoys an additional level of protection relative to the first subnet 510, the second subnet 512 is often referred to as being the "stronger" of the two while the first subnet 510 is often referred to as the "weaker" of the two.

As previously set forth, the first and second firewalls 506 and 508 operate by controlling traffic, typically, by rejecting the traffic or routing it to selected destinations. Based upon how the first and second firewalls 506 and 508 control traffic, the various servers forming the first and second subnets 510 and 512 may be further classified. More specifically, the first firewall 506 directs a user accessing the screened subnet 500 from the Internet 502 to the web server 510-1. The first firewall 506 will not, however, allow that user to access any of the other servers 510-2 through **510-*x* forming part of the first subnet 510, any of the servers forming part of the second subnet 512 nor any of the servers forming part of the intranet 504. Accordingly, as the first firewall 506 has, in effect, segregated the web server 510-1 from the remainder of the first subnet 510, the first subnet 510 may be viewed as being comprised of a front weak VLAN 522 comprised of the web server 510-1 (and any mirrored web servers not shown in FIG. 5) and a back weak VLAN 524 comprised of the remaining servers 510-2 through 510-*x* forming part of the first subnet 510**.

The second firewall 508 does not segregate the various servers 512-1 through **512-*y* forming the second subnet 512 by directing incoming traffic to a specific server or servers thereof. Rather, the second firewall 508 will allow traffic originating from servers located within the front weak VLAN 522 or the back weak VLAN 524 to travel to servers located within the strong VLAN 526 to which the traffic had been addressed. Thus, the second firewall 508 will allow traffic from the web server 510-1 to travel to the application server 512-1. The second firewall 508 will further allow traffic from the access server 510-2 to travel to the registry server 512-2. The second firewall 508 will, however, block traffic originating on the Internet 502 from both the second subnet 512 and the intranet 504 and block traffic originating on either the front weak VLAN 522 or the back weak VLAN 524 from the intranet 504 Accordingly, the various servers 512-1 through 512-*y* forming the second subnet 512 may be viewed as comprising a strong VLAN 526. The second firewall 508 does, however, segregate the strong VLAN 526 from the intranet 504. Thus, any server accessible to one of the servers forming part of either the front weak VLAN 522 or the back weak VLAN 524 through the second firewall 508 should be view as forming part of the strong VLAN 526 while those servers which cannot be accessed by one of the servers forming part of either the front weak VLAN 522 or the back weak VLAN 524 should be viewed as forming part of the intranet 504**.

Continuing to refer to FIG. 5, the screened subnet 500 further includes a secured utility VLAN 516 coupled to both of the first and second subnets 510 and 512 by a third protective device 514. The secured utility VLAN 516 may be further characterized as a shared secured utility VLAN since the utility servers which provide all of the utility services to the various servers forming part of both the weak back VLAN 524 and the strong VLAN 526 reside therein. Thus, all utility services for the weak back VLAN 524 and the strong VLAN 526 are segregated from the remainder of the subnet 500. The shared secured utility VLAN 516 is comprised of one or more servers configured to provide various services such as maintenance, reporting, backup, logging or other services, in support of one or more of the access server 510-2, the other level 1 servers 510-3 through **510-*x*, the application server 512-1, the registry server 512-2 and/or the other level 2 servers 512-3 through 512-*y*. As before, the configuration of the server or servers which comprise the shared secured utility VLAN 516** is not disclosed in further detail, however, since it may vary depending on the particular utility services to be provided thereby and/or the particular level 1 or level 2 servers for which utility services are to be respectively provided thereby.

In the past, the server or servers providing utility services for servers located in the screened subnet, for example, the utility servers 110-3 and 112-3 which provided utility services for the servers 110-2 through **110-*x* and 112-1 through 112-*y* of the first and second subnets 110 and 112, respectively, of the screened subnet 100, were at risk of being vandalized, manipulated or otherwise compromised by unauthorized users. The embodiment of the present invention illustrated in FIG. 5 provides an additional level of protection for those servers providing utility or maintenance service to the weak back VLAN 524 and the strong VLAN 526. More specifically, after segregating, within the shared secured utility VLAN 516, those servers providing utility services to the weak back VLAN 524 and the strong VLAN 526, the shared secured utility VLAN 516 is provided with an additional level of protection relative to the servers for which it provides utility or maintenance services therefore. The additional level of protection is achieved by coupling the shared utility VLAN 516 to both the weak back VLAN 524 and the strong VLAN 526 through the third protective device 514**.

When constructed in the manner illustrated in FIG. 5, utility traffic from the various servers of the weak back VLAN 524 would flow through the third protective device 514 and on to the shared secured utility VLAN 516. Conversely, traffic from the shared secured utility VLAN 516 would flow through the third protective device 514 and on to the weak back VLAN 524. Similarly, utility traffic from the various servers of the strong VLAN 526 would flow through the third protective device 514 and on to the shared secured utility VLAN 516. Conversely, traffic from the shared secured utility VLAN 516 would flow through the third protective device 514 and on to the strong VLAN 526.

Bi-directional traffic, typically for administrative and data purposes, between the shared secured VLAN 516 and the intranet 504 is provided by a direct connection between the intranet 504 and the third protective device 514 using a link 530. By utilizing the link 530, the system administrator may readily access the shared secured utility VLAN 516 while avoiding the first and second firewalls 506 and 508, thereby avoiding any increased vulnerability to the first subnet 510 and/or the second subnet 512 which results from providing additional paths through the first firewall 506 and/or the second firewall 508.

While, for the various reasons set forth above, the use of the shared secured utility VLAN 516 enhance the security of the server or servers providing utility services for the weak back VLAN 524 and the strong VLAN 526, it is further contemplated that a variety of other benefits are achievable through use of the shared secured utility VLAN 516. More specifically, by segregating the various utility and maintenance servers which collectively comprise the shared secured utility VLAN 516, performance of the utility functions may again improve in the manner previously described. Still further benefits are achieved by the use of a shared secured utility VLAN, for example, the shared secured utility VLAN 516, in a screened subnet rather than a pair of secured utility VLANs, for example, the first and second secured utility VLANs 316 and 320. More specifically, it is contemplated that setup, maintenance and troubleshooting of the screened subnet shall be easier when the screened subnet includes a shared secured utility VLAN. Further, the use of duplicate servers can be avoided since a single utility server can serve both the weak back VLAN 524 and the strong VLAN 526. Other benefits are achieved by the use of a single protective device, for example, the third protective device 514, rather than a pair of protective devices, for example, the third and fourth protective devices 414 and 416, to protect a shared secured utility VLAN. For example, by reducing the number of protective devices required, cost savings may be achieved through the life of the protective device 514. Such cost savings will be at least partially offset, however, by various increased complexity issues raised the interconnection of the third protective device 514 to both the weak back VLAN 524 and the strong VLAN 526

It is further contemplated that, by funneling all utility traffic for both the weak back VLAN and the strong VLAN to a single shared secured utility VLAN, for example, the shared secured VLAN 516, rather than to respective secured utility VLANs, for example, the first and second secured utility VLANs 316 and 320, the ability of the system administrator for the screened subnet 500, as well as the intranet 504 which it protects, to perform traffic analysis, capacity planning and other administrative tasks will be even more enhanced by providing respective a single point from which all utility traffic for both the weak back VLAN 524 and the strong VLAN 526 may be measured. The ability of the system administrator to perform these tasks is further enhanced by the need for only one direct link, more specifically, the link 530, between the intranet 504 and the shared secured utility VLAN 516.

In addition to the aforementioned advantages obtained when using a shared secured utility VLAN, when weighing the relative merits of the use of a shared secured utility VLAN in which utility services for both the weak back VLAN and the strong VLAN are segregated or, in the alternative, the use of first and second secured utility VLAN in which utility services for the weak back VLAN and the strong VLAN are respectively segregated, a variety of other considerations may also be taken into account. A number of these considerations support the use of a shared secured utility VLAN. Generally, the use of a shared secured utility VLAN is considered to be more economical. For example, the use of a shared secured utility VLAN will centralize the provided utility services, reduce requirements for hardware and software support and reduce requirements for maintenance and administrative support. On the other hand, a shared secured utility VLAN typically takes longer to deploy, poses a greater security risk and is vulnerable to a single point failure. Other considerations support the use of a pair of secured utility VLANs. For example, a pair of secured utility VLANs can be deployed faster, pose less of a security risk and avoid the vulnerability of having a single point of failure. Conversely, due to both the additional equipment required and the decentralization of the utility services provided thereby, a pair of secured utility VLANs tend to be more costly to install and support.

In one embodiment of the invention, it is contemplated that the third protective device 514 is a choke router. In another embodiment of the invention, it is contemplated that the third protective device 514 is a firewall. When weighing the relative merits of these two distinct embodiments of a screened subnet having a shared secured utility VLAN, various considerations support the use of a choke router for the third protective devices 514 while other considerations support the use of a firewall. The reasons in support of and/or against selection of a choke router and/or a firewall were previously set forth in connection with the description of FIG. 4 and need not be repeated again herein.

Thus, there has been described and illustrated herein, various embodiments of a screened subnet having a utility VLAN in which those servers providing utility services for a weak back VLAN and a strong VLAN of the screened subnet have been segregated. However, those skilled in the art should recognize that numerous modifications and variations may be made in the techniques disclosed herein without departing substantially from the spirit and scope of the invention. Accordingly, the scope of the invention should only be defined by the claims appended hereto.

The invention claimed is:

1. A screened subnet for interconnecting a first network with a second network, comprising:
    a first protective device configured for coupling to said first network;
    a subnet which includes at least one computer system, said subnet coupled to said first protective device, said first protective device providing a first level of protection, from said first network, to at least one portion of said subnet;
    a second protective device coupled to said first protective device and configured for coupling to said second network; and
    a secured utility VLAN for providing utility services for said at least one portion of said subnet, said secured utility VLAN comprised of at least one computer system, and
    said secured utility VLAN coupled to said subnet such that said secured utility VLAN has a second level of protection from said first network.

2. The apparatus of claim 1, wherein said secured utility VLAN is coupled to said second protective device, said second protective device providing said secured utility VLAN with said second level of protection.

3. The apparatus of claim 2, wherein said first protective device is a first firewall and said second protective device is a second firewall.

4. The apparatus of claim 3, wherein a VLAN encompasses said at least one portion of said subnet.

5. The apparatus of claim 1, and further comprising:
    a third protective device coupled to said subnet;

said secured utility VLAN coupled to said third protective device and said third protective device providing said secured utility VLAN with said second level of protection.

6. The apparatus of claim 5, wherein said first protective device is a first firewall, said second protective device is a second firewall and said third protective device is a choke router.

7. The apparatus of claim 6, wherein a VLAN encompasses said at least one portion of said subnet.

8. The apparatus of claim 5, wherein said first protective device is a first firewall, said second protective device is a second firewall and said third protective device is a third firewall.

9. The apparatus of claim 8, wherein a VLAN encompasses said at least one portion of said subnet.

10. The apparatus of claim 5, and further comprising a link configured for coupling said third protective device to said second network.

11. A screened subnet for interconnecting a first network with a second network, comprising:
a first protective device configured for coupling to said first network;
a first subnet which includes at least one computer system in a first portion thereof and at least one computer system in a second portion thereof, said first subnet coupled to said first protective device, said first protective device providing a first level of protection, from said first network, to said second portion of said first subnet;
a second protective device coupled to said first protective device and configured for coupling to said second network;
a second subnet which includes at least one computer system, said second subnet coupled to said second protective device, said first protective device providing a first level of protection, from said first network, to said second subnet; and
a first secured utility VLAN for providing utility services for said first portion of said first subnet, said first secured utility VLAN comprised of at least one computer system;
said first secured utility VLAN coupled to said first subnet such that said first secured utility VLAN has a second level of protection from said first network.

12. The apparatus of claim 11, wherein said first secured utility VLAN is coupled to said second protective device, said second protective device providing said first secured utility VLAN with said second level of protection from said first network, said second protective device further providing a second level of protection, from said first network, to said second subnet.

13. The apparatus of claim 12, wherein said first protective device is a first firewall and said second protective device is a second firewall.

14. The apparatus of claim 13, wherein a first VLAN encompasses said first portion of said first subnet and a second VLAN encompasses said second portion of said first subnet, said first protective device not providing said first level of protection, from said first network, to said first portion of said first subnet.

15. The apparatus of claim 11, and further comprising:
a third protective device coupled to said first subnet;
said first secured utility VLAN coupled to said third protective device and said third protective device providing said first secured utility VLAN with said second level of protection.

16. The apparatus of claim 15, wherein a first VLAN encompasses said first portion of said first subnet and a second VLAN encompasses said second portion of said first subnet, said first protective device not providing said first level of protection, from said first network, to said first portion of said first subnet.

17. The apparatus of claim 15, and further comprising a link configured for coupling said third protective device to said second network.

18. The apparatus of claim 15, and further comprising:
a second secured utility VLAN for providing utility services for said second subnet, said second secured VLAN comprised of at least one computer system;
said second protective device providing a second level of protection, from said first network, to said second subnet; and
said second secured VLAN coupled to said second subnet such that said second secured utility VLAN has a third level of protection from said first network.

19. The apparatus of claim 18, and further comprising:
a fourth protective device coupled to said second subnet;
said second secured utility VLAN coupled to fourth protective device and said fourth protective device providing said second secured utility VLAN with said third level of protection.

20. The apparatus of claim 19, wherein a first VLAN encompasses said first portion of said first subnet and a second VLAN encompasses said second portion of said first subnet, said first protective device not providing said first level of protection, from said first network, to said first portion of said first subnet.

21. The apparatus of claim 19, and further comprising:
a first link configured for coupling said third protective device to said second network; and
a second link configured for coupling said fourth protective device to said second network.

22. The apparatus of claim 19, wherein said first protective device is a first firewall, said second protective device is a second firewall, said third protective device is a first choke router and said fourth protective device is a second choke router.

23. The apparatus of claim 19 wherein said first protective device is a first firewall, said second protective device is a second firewall, said third protective device is a third firewall and said fourth device is a choke router.

24. The apparatus of claim 19, wherein said first protective device is a first firewall, said second protective device is a second firewall, said third protective device is a choke router and said fourth protective device is a third firewall.

25. The apparatus of claim 19, wherein said first protective device is a first firewall, said second protective device is a second firewall, said third protective device is a third firewall and said fourth protective device is a fourth firewall.

26. A screened subnet for interconnecting a first network with a second network, comprising:
a first protective device configured for coupling to said first network;
a first subnet which includes at least one computer system in a first portion thereof and at least one computer system in a second portion thereof, said first subnet coupled to said first protective device, said first protective device providing a first level of protection, from said first network, to said second portion of said first subnet;
a second protective device coupled to said first protective device and configured for coupling to said second network;

a second subnet which includes at least one computer system, said second subnet coupled to said second protective device, said first protective device providing a first level of protection, from said first network, to said second subnet and said second protective device providing a second level of protection, from said first network, to said second subnet; and a shared secured utility VLAN for providing utility services for said first portion of said first subnet and said second subnet, said secured shared utility VLAN comprised of at least one computer system;

said shared secured utility VLAN coupled to said first and second subnet that said shared secured utility VLAN has a second level of protection, from said first network, from accesses via said first subnet and a third level of protection, from said first network, from accesses via said second subnet.

27. The apparatus of claim 26 and further comprising:
a third protective device coupled to said first subnet and to said second subnet;
said shared secured utility VLAN coupled to said first and second subnets by said third protective device, said third protective device providing said shared secured utility VLAN with said second level of protection from accesses via said first subnet and said third level of protection from accesses via said second subnet.

28. The apparatus of claim 27, wherein a first VLAN encompasses said first portion of said first subnet and a second VLAN encompasses said second portion of said first subnet, said first protective device not providing said first level of protection, from said first network, to said first portion of said first subnet.

29. The apparatus of claim 27, and further comprising a link configured for coupling said third protective device to said second network.

30. The apparatus of claim 27, wherein said first protective device is a first firewall, said second protective device is a second firewall and said third protective device is a choke router.

31. The apparatus of claim 27, wherein said first protective device is a first firewall, said second protective device is a second firewall and said third protective device is a third firewall.

32. The apparatus of claim 25, and further comprising:
a third protective device coupled to said first subnet;
a fourth protective device coupled to said second subnet;
said shared secured utility VLAN coupled to said first subnet by said third protective device and coupled to said second subnet by said fourth protective device, said third protective device providing said shared secured utility VLAN with said second level of protection from accesses via said first subnet and said fourth protective device providing said shared secured utility VLAN with said third level of protection from accesses via said second subnet.

33. The apparatus of claim 32, wherein a first VLAN encompasses said first portion of said first subnet and a second VLAN encompasses said second portion of said first subnet, said first protective device not providing said first level of protection, from said first network, to said first portion of said first subnet.

34. The apparatus of claim 32, and further comprising:
a first link configured for coupling said third protective device to said second network; and
a second link configured for coupling said fourth protective device to said second network.

35. The apparatus of claim 32, wherein said first protective device is a first firewall, said second protective device is a second firewall, said third protective device is a first choke router and said fourth protective device is a fourth choke router.

36. The apparatus of claim 32, wherein said first protective device is a first firewall, said second protective device is a second firewall, said third protective device is a choke router and said fourth protective device is a third firewall.

37. The apparatus of claim 32, wherein said first protective device is a first firewall, said second protective device is a second firewall, said third protective device is a third firewall and said fourth protective device is a choke router.

38. The apparatus of claim 32, wherein said first protective device is a first firewall, said second protective device is a second firewall, said third protective device is a third firewall and said fourth protective device is a fourth firewall.

* * * * *